United States Patent [19]
Downs et al.

[11] Patent Number: 4,547,335
[45] Date of Patent: Oct. 15, 1985

[54] FUEL ROD SUPPORT GRID

[75] Inventors: Robert E. Downs, Monroeville; Ambrose L. Schwallie, Greensburg, both of Pa.

[73] Assignee: The United States of America as represented by the United States Department of Energy, Washington, D.C.

[21] Appl. No.: 523,293

[22] Filed: Aug. 15, 1983

Related U.S. Application Data

[63] Continuation of Ser. No. 233,226, Feb. 10, 1981, abandoned.

[51] Int. Cl.⁴ ............................................. G21C 3/34
[52] U.S. Cl. .................................. 376/442; 376/438
[58] Field of Search .............................. 376/442, 438

[56] References Cited

U.S. PATENT DOCUMENTS 3,068,163 12/1962 Currier ................................ 376/442
3,176,762 4/1965 Greenwood ...................... 376/442
3,356,582 12/1967 Saunders ........................... 376/438

Primary Examiner—Donald P. Walsh
Attorney, Agent, or Firm—James W. Weinberger; Robert J. Fisher; Judson R. Hightower

[57] ABSTRACT

A grid for the support of nuclear fuel rods arranged in a triangular array. The grid is formed by concentric rings of strap joined by radially arranged web sections.

6 Claims, 9 Drawing Figures

U.S. Patent  Oct. 15, 1985  Sheet 1 of 4  4,547,335
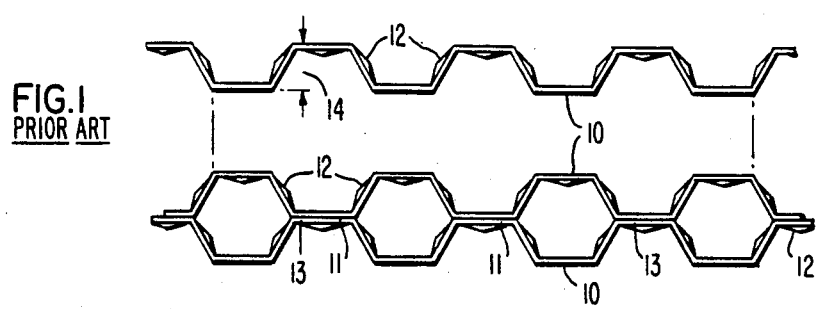
FIG. 1
PRIOR ART
FIG. 4
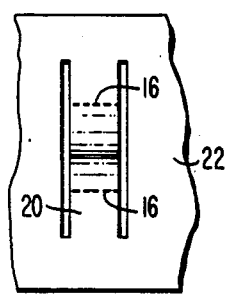
FIG. 5
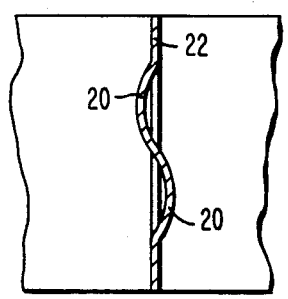
FIG. 6
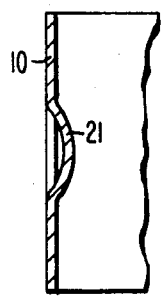
FIG. 7
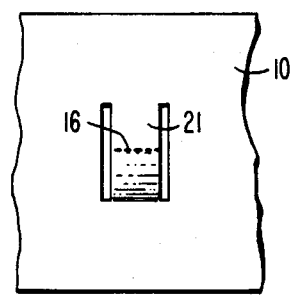

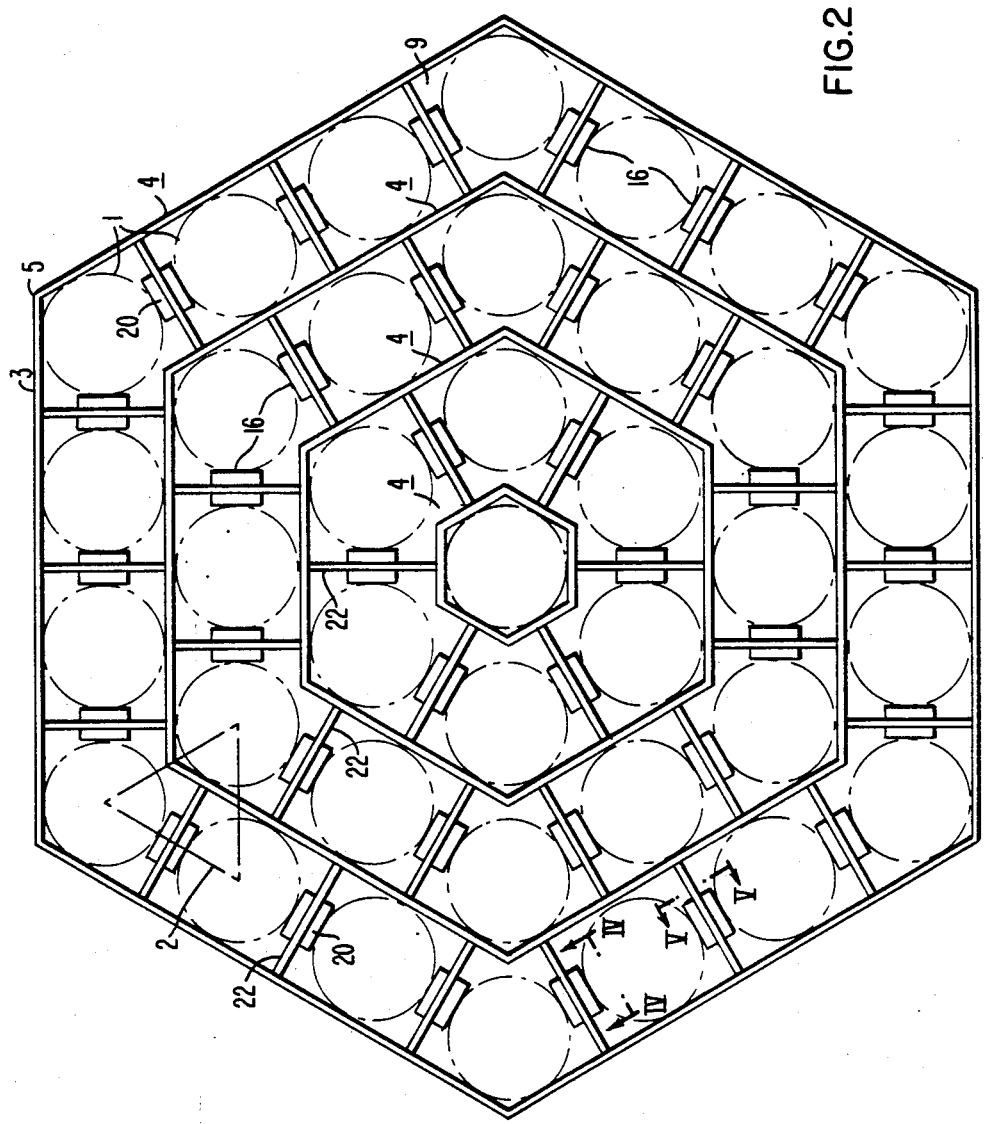

FUEL ROD SUPPORT GRID

GOVERNMENT CONTRACT

This invention was conceived during performance of a contract with the United States Government, designated DE-AMO2-76CH94000.

This application is a continuation of application Ser. No. 233,226 filed Feb. 10, 1981 now abandoned.

BACKGROUND OF THE INVENTION

1. Field of the Invention:

This invention relates to a new design for a support grid for triangular arrays of nuclear fuel rods, especially for hexagonal fuel assemblies for sodium-cooled fast reactors.

The core of a nuclear reactor usually consists of a grouping of fuel assemblies. Each fuel assembly is a grouping of cylindrical fuel rods which are arranged and supported by grids which are spaced axially along the fuel assembly. The support grids define the geometric pattern of cells for the fuel rods and maintain the correct spacing between rods.

Some nuclear reactor designs specify hexagonal fuel assemblies, with fuel rods arranged in a triangular array. A triangular array of rods is defined herein as a geometric pattern of rods in which three imaginary lines joining the centers of any three mutually adjacent rods (see 2 in FIG. 2) in the assembly form an equilateral triangle. The triangular array is repetitious such that the family of all imaginary triangles formed by the centers of all possible groups of three mutually adjacent rods in the assembly consists of congruent triangles. The prior art provides grids for triangular arrays, but these, as shown below, have fabrication and technical disadvantages.

2. Description of the Prior Art:

An example of prior art is illustrated in FIG. 1. The fabrication of a hexagonal grid for a triangular array of rods is accomplished by the stacking of many deeply corrugated straps 10. These corrugated straps 10 are stamped into a corrugated shape and welded together at all locations 11 axially above and below dimples 12. The dimples 12 are one-point contact devices which support the fuel rods 1. After a stack of sufficient size is obtained, portions of the stack are cut away until the remaining stack has a hexagonal cross section. The perimeter of the stack is wrapped with a strap which then forms the enclosing member of the grid.

The stacking of the corrugated straps results in the creation of double walls 13 at periodic locations in the grid. These double walls constitute flow restrictions in the final fuel assembly.

The depth 14 of each corrugation in a strap may vary during manufacturing due, for example, to stamping die wear. Experience has shown these variations in depth 14 to be trending rather than statistical, such that all straps in a manufactured batch may have depth 14 slightly deeper (or shallower) than design. In the stacking operation presently used to construct grids, the deviations are cumulative, such that the height of the final grid becomes distorted. This distortion problem originates at the strap stamping stage, but is only manifested later in the stacking stage of fabrication at which time the only capability to adjust to dimensional variations is the flexibility of the dimples 12. The practical result is that the sum of the cumulative deviations occasionally exceeds the dimple 12 flexibility such that some rods cannot be inserted and the entire grid must be discarded.

A variety of manufacturing problems introduces variation in the exact placement of the dimples 12. Such variation causes the rod to be more or less firmly secured than desired since even a slight shift in dimple position changes the distance between dimple contact points within a cell.

The fabrication of an annular grid (a grid with an empty center) is presently accomplished by the fabrication of a complete grid by stacking, cutting to a hexagonal outside shape and banding the outside surface, followed by the cutting out and removal of the center section, and banding of the inside hexagonal surface. The need to fabricate a complete grid is occasioned by the nature of the stacking method wherein the positioning, alignment, and support of a strap during welding is achieved by reference to the previously welded strap. The center section of the grid cannot be merely omitted since it has a fabrication process role. All the labor and material associated with this center region is presently wasted. Moreover, the resulting annular grid must have at least two rows of fuel rod holes such that a mechanically sound structure is maintained during the cutting operation.

The above description of the state of the prior art indicates a need for a grid which can support fuel rods in a triangular array, which can be manufactured without the stacking of straps and without the extra manufacturing operations to form annular or polygonal grids.

SUMMARY OF THE INVENTION

The invention is a grid design for a triangular array in which the grid is constructed of concentrically arranged straps, joined by radially arranged webs. The webs and straps have dimples in locations appropriate to bear against and support the fuel rods. The dimples may be flat, cylinder-on-cylinder, spring-loaded contact devices or may be point contact devices as desired. The dimples may be double dimples, which are designed to support two fuel rods each, or single dimples, each of which support one rod.

The web and strap construction method disclosed herein is applicable to fuel assemblies of polygonal cross-section, such as a hexagonal assembly. The preferred embodiments discussed below relate to hexagonal fuel assemblies.

BRIEF DESCRIPTION OF THE DRAWINGS

The invention will be best understood by reference to the following detailed description taken in connection with the accompanying drawings, in which:

FIG. 1 is an illustration of prior art;

FIG. 2 is a straight-strap embodiment of the invention;

FIGS. 4 and 5 are views from FIG. 2 as indicated, showing deails of a double dimple;

FIGS. 6 and 7 are views from FIG. 3 as indicated, showing details of a single dimple.

DETAILED DESCRIPTION OF THE INVENTION

First Described Embodiment

Figure 3:
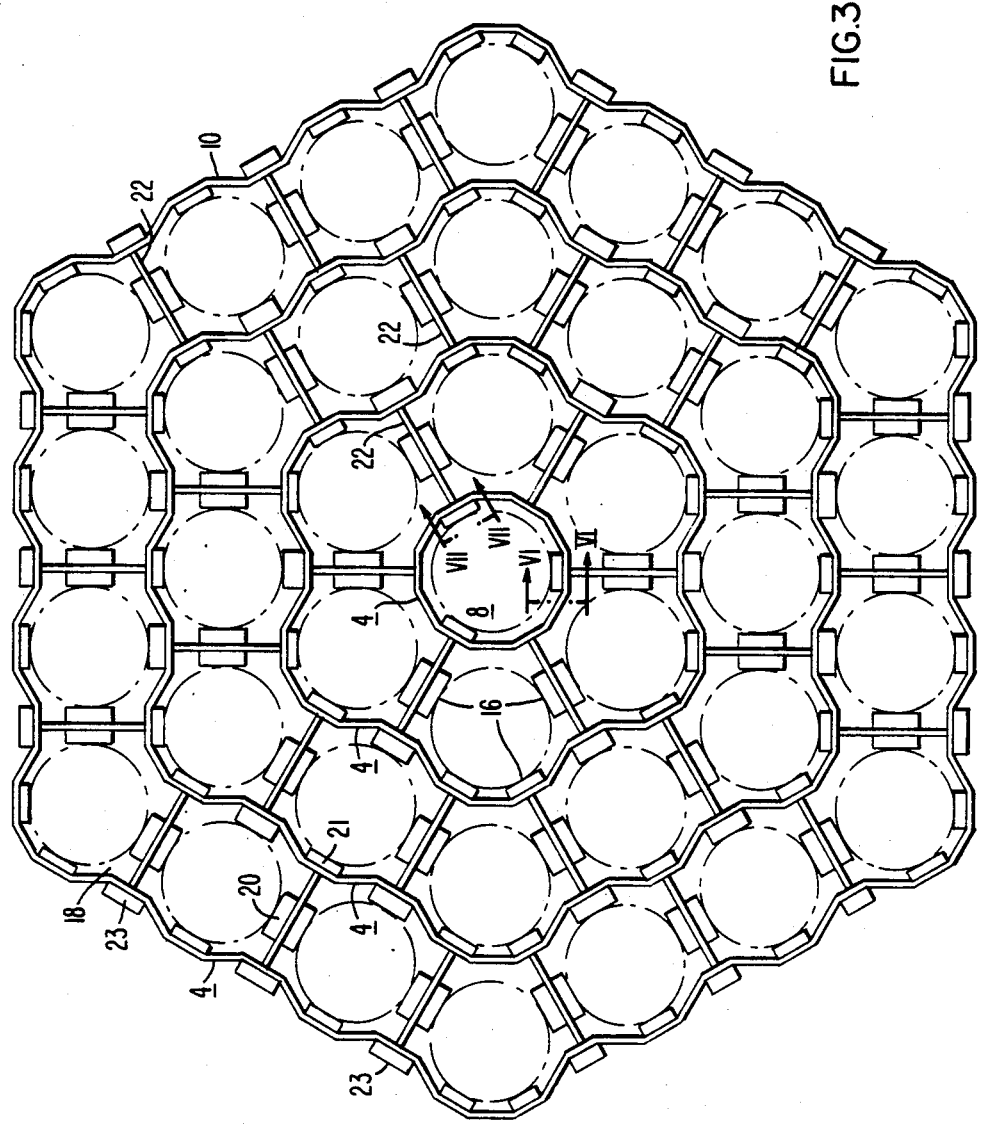
FIG. 3 is a corrugated-strap embodiment of the invention.

The invented grid is shown in one embodiment in FIG. 2 which shows a grid which supports 37 cylindrical fuel rods 1 in a triangular array 2, forming a hexagonal assembly. The flat straps 3 are formed into hexagonal rings 4 and welded at the corners 5. The radial webs 22 each extend only between adjacent rings 4 and are welded to the flat straps 3 at each end of the web 22. Double dimples 20 are integral to the web 22. The central cell 8 has dimples in the flat strap 3, as shown in FIG. 2.

FIGS. 4 and 5 are views from FIG. 2 which show the details of a double dimple 20. FIGS. 6 and 7 are views from FIG. 3 as indicated which show the details of a single dimple 21 which are used to support the center rod in FIG. 2. These dimples 20, 21 are structures integral to the strap or web material.

Figure 8:
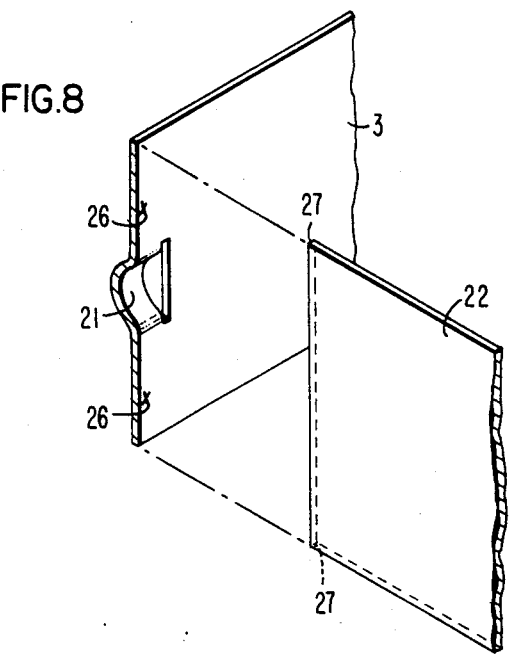
FIGS. 8 and 9 show details of strap-to-web joints.
Figure 9:
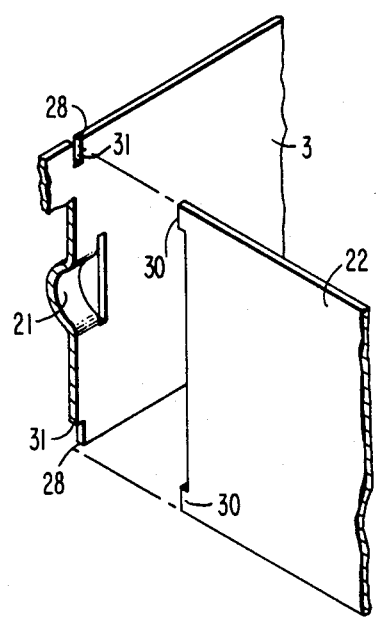

The invented grid is not fabricated by the stacking method, and does not have a cumulative deviation problem. The grid can be assembled in a welding fixture which receives and temporarily supports the flat straps in the appropriate shape and location. Any variation in cell size is due to the characteristics of the welding fixture which can be detected and corrected before grid fabrication. The grid cell is completed by selection and installation of webs 22 such that a tight fit is accomplished. If butt weld joints as shown in FIG. 8 are used, the tight fit is achieved by the use of webs of slightly varying length, selected as needed. If a tongue-and-groove weld joint as shown in FIG. 9 is used, the slip of the joint may be used to achieve the tight fit such that only standard webs of a single size are needed. The final deviation in cell size is not cumulative over the grid. Obviously, any deviation existing will, in this new design, be within the adjustable range of the dimples in all but most unusual circumstances. The escape from the stacking method of fabrication is directly occasioned by the use of radial webs. These webs eliminate the prior art need for direct contact between the straps to accommodate the welds (11 in FIG. 1) which support the grid.

The flat-leaf, single and double dimples 20, 21 in this invention have a cylinder-on-cylinder (cylinder axes perpendicular) linear feature 16 (FIGS. 2, 3) in precisely the direction of any deviation in dimple position which may occur. Small positional deviations will not therefore result in a loosely-held rod unless the deviation exceeds one-half the dimple width.

Since the strap is positioned and supported by a welding fixture during fabrication, an annular grid may be prepared by mere omission of the center section, and may be prepared for only a single row of fuel rods which was not achievable by the stacking method.

The final grid has no double walls such that less flow restriction is anticipated.

The grid reprsented in FIG. 2 is useful for certain applications, but cannot accommodate a fuel rod array in which the rods are closer together such that no line-of-sight gap exists between rods adequate to admit the hexagonal rings 4 of flat strap 3. Accordingly, another preferred embodiment is disclosed below.

Second Described Embodiment

FIG. 3 is an embodiment of the invention in which corrugated straps 10 are used to fabricate the hexagonal rings 4. This grid has closely-spaced fuel rods and has no line-of-sight clearance between adjacent rod rings.

This second embodiment employs corrugated strap 10 as does the prior art described above. The depth of the corrugations in the new invention is less than that of the prior art since the former is utilized to accommodate a mere reduction in rod-to-rod pitch while the latter must extend over an entire rod radius.

In this design, the dimples occur in both web positions and strap positions. FIGS. 4, 5, 6, and 7 show details of the double dimples 20 in FIG. 3 and single dimples 21 in FIG. 3. The center rod 8 may be supported by additional dimples over the three shown in FIG. 3.

The construction technique for this second embodiment also involves the use of tongue-and-groove joints or variable-length webs 22 each extending between adjacent rings 4 only. The same advantages as enumerated for the first embodiment apply. Deviations in the depth of the corrugations in the corrugated strap 10 will affect only cells adjacent to the strap, are not cumulative across the grid, and are within the adjustment range of the support dimples. The corrugated strap 10 may still be supported in a welding fixture since the use of tongue-in-groove joints or webs of varying length will provide the flexibility needed to adjust to the depth deviations.

FIG. 3 shows single dimples 21 at location 23 which are unused. These are shown in the drawing since the use of standardized corrugated strap 10 for all hexagonal rings 4 results in the existence of these unneeded dimples. These may alternatively be omitted.

Both of the above preferred embodiments employ a web and strap construction which involves the joinder of web and strap members while these are supported and formed into the desired grid shape in a welding fixture comprising grooved plates and a welding machine. The strap sections are cut to the appropriate lengths to form the needed rings from previously prepared standard strap which has the dimples already constructed at appropriate intervals. The standard strap may be prepared in standard lengths or even in large rolls. The strap sections are inserted into the grooves in the welding fixture plates which shapes the strap into hexagonal rings of predetermined size. Web sections are inserted into welding fixture plate grooves which bring these webs into suitable proximity for welding to the rings. It is at this step when webs of slightly varying length are chosen to ensure affirmative contact with the rings and accommodate slight variations in ring-to-ring distance.

The welding may be by electron beam, resistance, laser or other methods.

FIG. 8 shows a butt joint between the web and strap in which the strap 3 is resistance-welded at points 26 and welded by electron beam or other method at contact lines 27.

FIG. 9 shows a tongue and groove joint between the web and strap, with welds at double contact lines 28. The tongue and groove method allows some flexibility of fit of a standard web length to accommodate small variations in ring-to-ring spacing due to the slide of the tongue 30 in the groove 31 while still providing welding double contact lines 28. This feature may reduce or eliminate the need for variable length web.

The grids in FIGS. 2 and 3 are shown for convenience to be for relatively small assemblies. In practice, the grid can be adapted to support many more rods in larger assemblies.

Since numerous changes in the above-described disclosure may be made without departing from the spirit and scope thereof, it is intended that all matter contained in the foregoing description and shown in the drawings be interpreted as illustrative rather than limiting.

We claim:

1. A grid for supporting fuel rods for use in nuclear reactors, said grid having the cross-sectional configuration of a regular hexagon, and the fuel rods which are supported by said grid being so disposed that the centers of any three mutually adjacent of said rods form the apexes of an equilateral triangle, said grid comprising:

a centrally disposed support member sized to support a single fuel rod and comprising a single strap;

a plurality of elongated strap members each having the general configuration of a regular hexagon and positioned concentrically about said centrally disposed support member, the dimensions of each of said strap members being such as to receive and retain between the centrally disposed support member and the next immediately surrounding concentric strap member and also between all concentric strap members hexagonally conformed and closely spaced single rows of fuel rods;

a plurality of web members bridging the spacing between adjacent turns of each of said strap members and affixed to said strap members and perpendicularly disposed with respect to said strap members, each of said web members spaced from one another a predetermined distance to form with said strap members a plurality of individual fuel-rod-receiving cells, said web members also bridging the spacing between said centrally disposed support member and the surrounding strap member which is closest to said centrally disposed support member to form six fuel-rod-receiving cells, with one of said formed fuel-rod-receiving cells disposed proximate each of the corner portions of the regular hexagon formed by said closest surrounding strap member; and the remainder of said web members forming with remaining hexagonally conformed strap members six additional fuel-rod-receiving cells for each additional concentric strap member which surrounds that hexagonal strap member which is closest to said centrally disposed support member, with one of the formed fuel-rod-receiving cells disposed proximate each of the corner portions of the regular hexagon formed by each of said concentric strap members, the centers of all fuel rods as supported by all of said formed fuel-rod-receiving cells which are positioned between oppositely disposed corners of the hexagonally conformed grid being aligned, and all other formed fuel-rod-receiving cells being staggered with the centers of fuel rods as supported by any three mutually adjacent of such supported fuel rods forming the apexes of an equilateral triangle.

2. The grid as specified in claim 1, wherein first, second and third elongated strap members are concentrically disposed about said centrally disposed strap member, six fuel-rod-receiving cells are formed between said centrally disposed support member and said first strap member and the bridging web member therebetween, twelve fuel-rod-receiving cells are formed between said first strap member and said second strap member and the bridging web members therebetween, and eighteen fuel-rod-receiving cells are formed between said second strap member and said third strap member and the bridging web members therebetween.

3. The grid as specified in claim 1, wherein said centrally disposed member and all of said strap members are formed as regular concentric hexagons.

4. The grid as specified in claim 3, wherein dimple means are provided integral with said strap members and said web members to provide support for fuel rods in said fuel-rod-receiving cells.

5. The grid as specified in claim 2, wherein said first and second and third strap members are corrugated.

6. The grid as specified in claim 5, wherein dimple means are provided integral with said strap members and said web members to provide support for fuel rods in said fuel-rod-receiving cells.

* * * * *